United States Patent Office 3,014,950
Patented Dec. 26, 1961

3,014,950
AROMATIC DI-FUNCTIONAL PHOSPHORUS ESTERS
Gail H. Birum, Dayton, Ohio, assignor to Monsanto Chemical Company, St. Louis, Mo., a corporation of Delaware
No Drawing. Filed Dec. 15, 1958, Ser. No. 780,224
8 Claims. (Cl. 260—461)

The present invention relates to organic compounds of phosphorus and more particularly provides a new and valuable class of aromatic di-functional phosphorus esters and the method of preparing the same.

According to the invention, there are provided aromatic phosphites or thiophosphites or aromatic phosphonites of esters of hydroxy phosphonic acids by the reaction of an aromatic trivalent phosphorus chloride with an aldehyde and a triorgano phosphite substantially according to the scheme

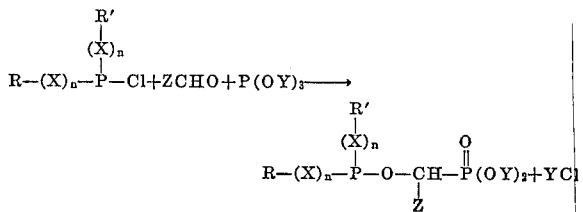

wherein R and R' are selected from the class consisting of (1) aromatic hydrocarbons which are free of olefinic and acetylenic unsaturation and which contain from 6 to 12 carbon atoms and (2) said aromatic hydrocarbons carrying halogen substitution, X is selected from the class consisting of —O— and —S—, $n$- is an integer of 0 to 1, Z is selected from the class consisting of hydrogen and hydrocarbyl radicals which are free of olefinic and acetylenic unsaturation and which contain from 1 to 11 carbon atoms, and Y is selected from the class consisting of alkyl and haloalkyl radicals of from 1 to 12 carbon atoms.

A class of aromatic trivalent phosphorus chlorides which are particularly suited for the present purpose are the aromatic dihydrocarbyl phosphorochloridites, i.e., compounds of the formula

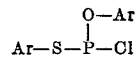

in which Ar is an aromatic hydrocarbyl radical which is free of olefinic and acetylenic unsaturation and which contains from 6 to 12 carbon atoms. Such compounds may be diaryl, bis(alkaryl), bis(aralkyl), aryl alkaryl, aryl aralkyl or alkaryl aralkyl phosphorochloridites, e.g., diphenyl, di-p-tolyl, di-α- or β-naphthyl, dibiphenylyl, dimesityl, dicumyl, bis(2-butylphenyl), phenyl α-naphthyl, biphenylyl phenyl, 4-ethylphenyl phenyl, debenzyl, bis(2-ethylphenyl) benzyl phenyl, biphenylyl 4-ethylbenzyl, 3-phenylpropyl mesityl, or β-naphthylmethyl phenyl phosphorocloridite.

The corresponding aromatic dihydrocarbyl phosphorochloridodithioites, i.e., compounds of the formula

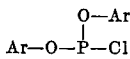

wherein Ar is as defined above, are similarly valuable for the present purpose. Such compounds are, for example, diphenyl phosphorochloridodithioite, dibenzyl phosphorochloridodithioite, di-β-naphthyl phosphorochloridodithioite, biphenylyl phenyl phosphorochloridodithioite, benzyl α-naphthylmethyl phosphorochloridodithioite, p-tolyl 2-phenylethyl phosphorochloridodithioite, etc.

Presently useful trivalent phosphorus halides also include the O-hydrocarbyl S-hydrocarbyl phosphorochloridothioites, i.e., compounds of the formula

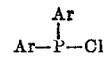

wherein Ar is as above described. Such compounds are, for example, O,S-diphenyl, O-benzyl S-phenyl, O,S-di-β-naphthyl, O,S-dibenzyl, O,S-di-m-tolyl, O-4-butylphenyl S-biphenylyl, O-β-naphthylmethyl S-phenyl, or O-2-phenylethyl S-p-cumyl phosphorochloridothioites.

A very valuable class of the presently useful chlorides includes the aromatic dihydrocarbylphosphinous chlorides, i.e., compounds of the formula

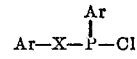

wherein Ar is as above defined. Such compounds are, e.g., diphenylphosphinous chloride, di-p-tolylphosphinous chloride, dibenzylphosphinous chloride, di-α- or β-naphthylphosphinous chloride, (2-ethylphenyl)phenylphosphinous chloride, benzylbiphenylylphosphinous chloride, bis(4-petylphenyl)phosphinous chloride, etc.

Also useful in the reaction with aldehyde and triorgano phosphite and the aromatic hydrocarbyl hydrocarbylphosphonochloridites and phosphonochloridothioites, i.e., compounds of the formula

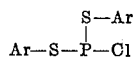

wherein Ar is as above defined and X denotes —O— or —S—. Examples of such compounds are phenyl, p-tolyl, benzyl, α-naphthyl, or biphenylyl phenylphosphonochloridite, phenyl or 4-ethylphenyl benzylphosphonochloridite, phenyl or β-naphthyl o-tolylphosphonochloridite, phenyl or benzyl biphenylylphosphonochloridothioite, phenyl or p-tolyl phenylphosphonochloridothioite, etc.

The above aromatic dihydrocarbyl phosphorochloridites, dihydrocarbylphosphorochloridodithioites, O-hydrocarbyl S-hydrocarbyl phosphorochloridothioites, dihydrocarbylphosphinous chlorides, hydrocarbyl hydrocarbylphosphonochloridites and hydrocarbyl hydrocarbylphosphonochloridothioites may contain one or more halogen substituents in either the aromatic ring thereof, at an aliphatic radical which is attached to the aromatic ring, or at both the aromatic ring and at said aliphatic residue. Examples of such halogen-substituted compounds are Bis(2-, 3- or 4-chlorophenyl) phosphorochloridite or phosphorochloridodithioite;

Bis(2-, 3- or 4-bromophenyl) phosphorochloridite or phosphorochloridodithioite;

O-2, 3- or 4-chloro or bromophenyl S-phenyl phosphorochloridothioite;

Bis(2,4-dichlorobenzyl) phosphorochloridite or phosphorochloridodithioite;

Bis(4-iodo-2-ethylphenyl) phosphorochloridite or phosphorochloridodithioite;

Bis(4 - (fluoroethyl)phenyl) phosphorochloridite or phosphorochloridodithioite;

Bis(pentachlorophenyl) phosphorochloridite or phosphorochloridodithioite;

Bis(α-chloro-β-naphthyl) phosphorochloridite or phosphorochloridodithioite, and

Bis(octachlorobiphenylyl) phosphorochloridite or phosphorochloridodithioite.

The presently useful aldehydes are formaldehyde and the hydrocarbon aldehydes which are free of olefinic and acetylenic unsaturation. They include, in addition, to formaldehyde, the alkanecarboxaldehydes such as acetaldehyde, propionaldehyde, n-butyraldehyde, isobutyraldehyde, valeraldehyde, isovaleraldehyde, n-hexaldehyde, n-heptaldehyde, 2-ethylhexaldehyde, n-octaldehyde, branched-chain nonanal derived by the "Oxo" process, either n-decanal or branched-chain decanal derived by the "Oxo" process, n-undecanal, and lauraldehyde; the benzenoid aldehydes such as benzaldehyde, o-, m- or p-tolualdehyde, phenylacetaldehyde, 2-phenylpropionaldehyde, 4 - ethylphenylacetaldehyde, n-hexylbenzaldehyde, biphenylcarboxaldehyde, and α- or β-naphthaldehyde; and the cycloparaffinic aldehydes, such as cyclohexanecarboxaldehyde or 2 - methylcyclopentanecarboxaldehyde, etc.

Triorgano phosphites useful for the present purpose are the simple trialkyl phosphites, such as trimethyl, triethyl, triisopropyl, tri-n-butyl, triamyl, tri(2-ethylhexyl), tridecyl, or tridodecyl phosphite; the mixed trialkyl phosphites such as dimethyl ethyl, diamyl propyl, ethyl methyl propyl, or dodecyl dimethyl phosphite; the simple haloalkyl phosphites, such as tris(2 - chloroethyl), tris(3-bromopropyl) tris(dichlorooctyl) and tris(3 - bromo - 2-chloropropyl) phosphite; the mixed haloalkyl phosphites, such as 2-chloroethyl bis(3-bromopropyl) phosphite or 2-chloroethyl 4-bromobutyl 2-chloropropyl phosphite; and mixed phosphites of both paraffinic and haloparaffinic alcohols such as bis(2-chloroethyl) methyl phosphite or 2-chloropropyl diethyl phosphite.

When there is employed as the aromatic trivalent phosphorus halide an aromatic dihydrocarbyl (or halogen-substituted aromatic hydrocarbyl) phosphorochloridite, the products have the formula

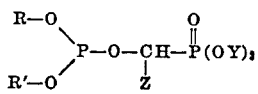

where R and R' are aromatic hydrocarbon radicals which are free of olefinic and acetylenic unsaturation and which contain from 6 to 12 carbon atoms or such hydrocarbon radicals carrying halogen substitution, Z is selected from the class of hydrogen and hydrocarbyl radicals which are free of olefinic and acetylenic unsaturation and which contain from 1 to 11 carbon atoms and Y is an alkyl or haloalkyl radical of from 1 to 12 carbon atoms, i.e., the compounds are dihydrocarbyl, bis(halohydrocarbyl) or hydrocarbyl halohydrocarbyl phosphites of alkyl or bis(halohydrocarbyl) (1-hydroxyhydrocarbyl) phosphonates.

When the trivalent phosphorus halide is an aromatic dihydrocarbyl or aromatic halogen-substituted dihydrocarbyl phosphorochloridodithioite, the products have the formula

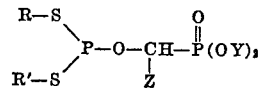

wherein R, R', Z and Y are as defined above, i.e., the compounds are S,S-dihydrocarbyl, S,S-bis(halohydrocarbyl), S-hydrocarbyl S-halohydrocarbyl phosphorodithioites of dialkyl or bis(haloalkyl) (1-hydroxyhydrocarbyl) phosphonates.

Similarly, when the phosphorus halide is an aromatic O-hydrocarbyl S-hydrocarbyl phosphorochloridothioite, the products have the formula

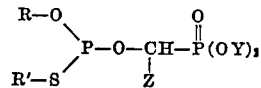

wherein R, R', Z and Y are as herein defined, i.e., they are O-hydrocarbyl S-hydrocarbyl phosphorothioites of dialkyl or bis(haloalkyl) (1-hydroxyhydrocarbyl)phosphonates or compounds in which either both or one of the O-hydrocarbyl and S-hydrocarbyl radicals contain halogen substitution.

When the aromatic trivalent phosphorus halide is a dihydrocarbylphoshinous chloride or a halogen-substituted dihydrocarbylphosphinous chloride, the products are dihydrocarbylphosphinites, bis(halohydrocarbyl)phosphinites, or (halohydrocarbyl)hydrocarbylphosphinites of dialkyl or bis(haloalkyl) (1 - hydroxyhydrocarbyl)phosphonates, i.e., they have the formula

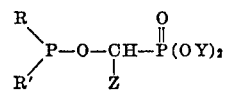

wherein R, R', Z and Y are as defined above.

When the aromatic trivalent phosphorus halide is a hydrocarbyl hydrocarbylphosphonochloridite or a halogen-substitution product thereof, the presently provided compounds have the formula

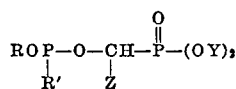

in which R, R', Z and Y are as defined above, i.e., they are aromatic hydrocarbyl hydrocarbylphosphonites, or halohydrocarbyl hydrocarbylphosphonites, or hydrocarbyl halohydrocarbylphosphonites or halohydrocarbyl halohydrocarbylphosphonites of dialkyl or bis(haloalkyl) (1-hydroxyhydrocarbyl)phosphonates.

When the aromatic trivalent phosphorus halide is a hydrocarbyl hydrocarbylphosphonochloridothioite or a halogen substitution product thereof, the presently provided compounds have the formula

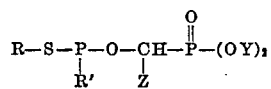

in which R, R', Z and Y are as herein defined, i.e., they are S-hydrocarbyl hydrocarbylphosphonothioites, S-hydrocarbyl halohydrocarbylphosphonothioites, S - halohydrocarbyl hydrocarbylphosphonothioites or S-halohydrocarbyl halohydrocarbylphosphonothioites of the (1-hydroxyhydrocarbyl)phosphonates.

An example of a useful compound of the formula

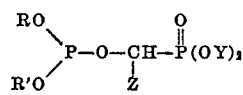

which is provided by the present invention is the diphenyl phosphite of diethyl (hydroxymethyl)phosphonate, i.e., it is a compound in which R and R' of the above formula are each phenyl radicals, Z is hydrogen, and Y is the ethyl radical. It is prepared from diphenyl phosphorochloridite, formaldehyde and triethyl phosphite. A particularly useful compound of the above formula is the bis(4-chlorophenyl) phosphite of bis(2-chloroethyl) (α-hydroxybenzyl)phosphonate, i.e., a compound of the above formula in which R and R' are 4-chlorophenyl radicals, Z is the phenyl radical, and Y is the 2-chloroethyl radical. It is prepared from bis(4-chlorophenyl) phosphorochloridite, benzaldehyde and tris(2 - chloroethyl)phosphite. Other compounds of this formula provided by the invention are for example:

Diphenyl phosphite of diethyl (1-hydroxyethyl)phosphonate

Diphenyl phosphite of bis(2-ethylhexyl) (1-hydroxy-2-ethylhexyl)phosphonate

Bis(4-chlorophenyl) phosphite of bis(2-chloroethyl) (α-hydroxybenzyl)phosphonate Di-α-naphthyl phosphite of di-n-butyl (1-hydroxypropyl)phosphonate Dibiphenylyl phosphite of dimethyl (1-hydroxybutyl) phosphonate Bis(2-ethylphenyl) phosphite of didecyl (1-hydroxyethyl)phosphonate Bis(pentachlorophenyl) phosphite of branched-chain dinonyl (1-hydroxy-2-methylpropyl)phosphonate Dibenzyl phosphite of dimethyl (1-hydroxydodecyl)-phosphonate Bis(4-iodobenzyl) phosphite of diisopropyl (1-hydroxyhexyl)phosphonate Di-p-tolyl phosphite of bis(2-chloropropyl) [hydroxy (α-naphthyl)methyl]phosphonate Bis(2-bromo-4-ethylphenyl) phosphite of diethyl (1-hydroxyethyl)phosphonate Diphenyl phosphite of diisobutyl (cyclohexylhydroxymethyl)phosphonate Bis(octachlorobiphenylyl) phosphite of bis(2-chloroethyl) (1-hydroxybenzyl)phosphonate Bis [4-(trichloromethyl)phenyl]phosphite of diethyl (1-hydroxyethyl)phosphonate 4-chlorophenyl phenyl phosphite of bis(trichloroethyl) (α-hydroxybenzyl)phosphonate An example of a useful compound of the formula

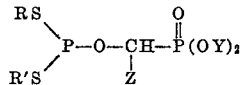

provided by the invention is the S,S-diphenyl phosphorodithioite of diethyl (hydroxymethyl)phosphonate, i.e., it is a compound in which R and R' are phenyl radicals, Z is hydrogen and both Y's are ethyl radicals. It is prepared according to the invention from diphenyl phosphorochloridodithioite, formaldehyde and triethyl phosphite. Another compound of the above formula which is provided by the invention is the S-α-naphthyl S-phenyl phosphorodithioite of bis(2-chloropropyl) (1-hydroxyethyl)phosphonate, i.e., it is a compound in which R of the above formula is the α-naphthyl radical, R' is the phenyl radical, Z is the methyl radical and both Y's are 2-chloropropyl radicals. It is prepared from α-naphthyl phenyl phosphorochloridodithioite, acetaldehyde and tris (2-chloropropyl) phosphite. Other compounds of the above formula provided by the invention are conveniently set forth in the table below:

| R and R= | Z= | Y= |
|---|---|---|
| phenyl | ethyl | methyl |
| 2-bromophenyl | n-butyl | n-butyl |
| pentachlorophenyl | phenyl | 2-chloroethyl |
| benzyl | 2-ethylpentyl | dodecyl |
| 2-phenylethyl | methyl | n-hexyl |
| p-tolyl | nonyl | 2-fluoroethyl |
| β-naphthyl | 2-methylpropyl | n-octyl |
| biphenylyl | ethyl | ethyl |
| 4-iodophenyl | α-naphthyl | 2-iodoethyl |
| 2,4-dichlorobenzyl | methyl | decyl |
| 4-(trifluoromethyl)phenyl | ethyl | n-propyl |
| octachlorobiphenylyl | phenyl | methyl |

Compounds of the formula

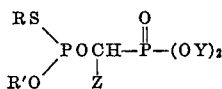

provided by the invention are, e.g., the S-phenyl O-phenyl phosphorothioite of di-n-butyl (hydroxymethyl)phosphonate (R and R'=phenyl, Z=H and Y=butyl) which is prepared from diphenyl phosphorochloridothioite, formaldehyde and tri-n-butyl phosphite; the S-α-naphthyl O-phenyl phosphorothioite of bis(2-chloroethyl) (1-hydroxypropyl)phosphonate which is prepared from S-α-naphthyl phenyl phosphorochloridothioite, propionaldehyde and tris(2-chloroethyl) phosphite; and the benzyl S-2,4-dichlorophenyl phosphorothioite of bis(3-bromopropyl) (α-hydroxybenzyl)phosphonate which is prepared from benzyl S-2,4-dichlorophenyl phosphorochloridothioite, benzaldehyde and tris(3-bromopropyl) phosphite.

Compounds of the formula

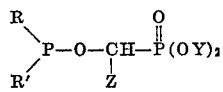

provided by the invention, are, e.g., the diphenylphosphinite of diethyl (hydroxymethyl)phosphonate which is obtained from diphenyl-phosphinous chloride, formaldehyde and triethyl phosphite; the di-p-tolylphosphinite of bis(2-ethylhexyl) (1-hydroxypropyl)phosphonate which is obtained from di-p-tolylphosphinous chloride, propionaldehyde and tris(2-ethylhexyl) phosphite; the (4-chlorophenyl)-α-naphthylphosphinite of bis(2-chloroethyl) (α-hydroxybenzyl)phosphonate which is obtained from (4-chlorophenyl-α-naphthyl)phosphinous chloride, benzaldehyde and tris(2-chloroethyl) phosphite; and the dibenzylphosphinite of didodecyl (α-naphthylhydroxymethyl) phosphonate which is obtained from dibenzylphosphinous chloride, α-naphthaldehyde and tridodecyl phosphite.

Examples of compounds of the formula

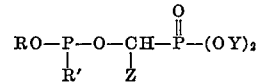

provided by the invention are the phenyl p-chlorophenylphosphonite of dimethyl (hydroxymethyl)phosphonate which is obtained from phenyl p-chlorophenylphosphonochloridite, formaldehyde and trimethyl phosphite; the benzyl β-naphthylphosphonite of bis(2-fluoroethyl) (α-hydroxy-2-phenylethyl)phosphonate which is prepared from benzyl β-naphthylphosphonochloridite, phenylaceta'dehyde and tris(2-fluoroethyl) phosphite; and the 3,4,5-trichlorophenyl 4-n-butylphenylphosphonite of bis(2-butyloctyl) (1-hydroxypropyl)phosphonate which is prepared from 3,4,5-trichlorophenyl 4-n-butylphenylphosphonochloridite, propionaldehyde and tris(2-butyloctyl) phosphite.

Compounds of the formula

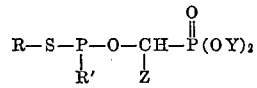

provided by the invention are e.g., the S-p-bromophenyl phenylphosphonothioite of diisopropyl (hydroxymethyl)-phosphonate which is prepared from p-bromophenyl phenylphosphonochloridothioite, formaldehyde and triisopropyl phosphite; the S-benzyl biphenylylphosphonothioite of bis(2-chloroethyl) (α-hydroxybenzyl)phosphonate which is prepared from benzyl biphenylylphosphonochloridothioite, benzaldehyde and tris(2-chloroethyl) phosphite; and the S-cumyl β-naphthylphosphonothioite of di-n-hexyl (1-hydroxybutyl)phosphonate which is prepared from cumyl β-naphthylphosphonothioite, butyraldehyde and tri-n-hexyl phosphite.

Reaction of the aromatic trivalent phosphorus chloride, the aldehyde and the trialkyl or tris(haloalkyl) phosphite takes place readily by contacting the three reactants at ordinary or moderately increased temperatures and allowing the resulting reaction mixture to stand until formation of the phosphite-phosphonates. Thus, said phosphorus chloride may be mixed with the phosphite and the aldehyde added to the resulting mixture, or the aldehyde and the phosphite may first be mixed and the chloride added thereto. Because the reaction is generally exothermic, gradual contact of the reactants is generally recommended in order to obtain smooth reaction. However, as will be apparent to those skilled in the art, the exothermal nature of the reaction becomes less of a factor as the molecular weight of the reactants, and particularly of the phosphite, increases. It is thus recommended that in each initial run, the three reactants be added to each other gradually at low temperatures and that external heating be employed only when there appears to be no spontaneous increase in temperature as a consequence of the addition. In most instances, the reaction is mildly exothermic initially. Whether the reaction goes to completion without the use of extraneous heat is determined by the nature of the reactants. Completion of the reaction, in any event, can be readily ascertained by noting cessation in change of viscosity, refractive index or the quantity of by-product alkyl halide. Reaction of the three components takes place readily in the absence of an inert diluent or catalyst. However, catalysts and diluents or solvents may be employed. The use of diluents may be particularly advantageous when working with the more reactive aldehydes; such diluents may be, e.g., benzene, toluene, dioxane, methylene chloride or hexane. When employing no diluent and using substantially the stoichiometric proportion of reactants, i.e., one molar equivalent of the halogen-containing phosphorus compound, one molar equivalent of the trivalent phosphorus ester and one molar equivalent of the carbonyl compound, the reaction product may be used directly for a variety of industrial and agricultural purposes without purification, i.e., it consists essentially of the phosphite-phosphonate dissolved in the haloalkane which is produced as a by-product in the reaction. Such solutions may be used without further purification, e.g., as biological toxicants or gasoline additives. However, the phosphite-phosphonate is readily separated from the by-product and/or extraneous solvents, e.g., by distillation. If an excess of any one of the three reactants is initially present, such an excess may also be separated from the product by distillation.

The presently provided phosphite-phosphonates are stable, generally high-boiling, materials which range from viscid liquids to waxy or crystalline solids. They are advantageously used as biological toxicants, e.g., as insecticides, fungicides, nematocides and bacteriostats. The essentially aromatic materials, i.e., those obtained from the aromatic trivalent phosphorus chloride and an aromatic aldehyde are particularly useful as functional fluids, e.g., in force-transmission media. When a plurality of chlorine substituents are present at the aromatic ring of said chloride, the compounds are highly valuable in dielectric evaluations. The present compounds are generally useful as plasticizers for synthetic resins and plastics, as rubber-compounding chemicals and as flame-proofing agents for cellulosic and carbonaceous, combustible materials, and as additives to leaded gasolines for the purpose of suppressing pre-ignition glow.

The invention is further illustrated by, but not limited to, the following examples:

Example 1

To a mixture consisting of 59.9 g. (0.36 mole) of triethyl phosphite and 91.0 g. (0.36 mole) of diphenyl phosphorochloridite, there was added, dropwise, 21.0 g. (0.36 mole) of propionaldehyde. The temperature rose exothermally to 38° C., at which point ice-cooling was applied and the remainder of the aldehyde was added while maintaining the temperature at from 20–25° C. When all of the aldehyde had been added, the reaction mixture was heated to 70° C. in order to insure complete reaction. By-product ethyl chloride and any unreacted material were removed by placing the reaction mixture under water-pump vacuum and heating it to 100° C. Concentration to a pot temperature of 176° C./0.2 mm., gave as residue 139.5 g. (94% theoretical yield) of the substantially pure diphenyl phosphite of diethyl (1-hydroxypropyl)phosphonate, $n_D^{25}$ 1.5222, analyzing 55.00% carbon and 6.48% hydrogen, as against 55.39% and 6.36%, the calculated values, and having the structure

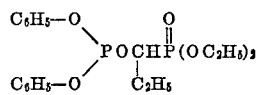

Example 2

Acetaldehyde (21.2 g., 0.48 mole) was added, dropwise, to a mixture consisting of 121.1 g. (0.45 mole) of tris(2-chloroethyl) phosphite and 108.8 g. (0.43 mole) of diphenyl phosphorochloridite. During addition of the aldehyde, the temperature was maintained, by ice-cooling, at from 21–23° C. When all of the aldehyde had been added, stirring was continued, first with cooling and subsequently at room temperature, until cessation in temperature rise. The reaction mixture was then heated to 80° C. in order to insure complete reaction, placed under water-pump vacuum and heated to 100° C. in order to remove by-product 1,2-dichloroethane and any unreacted material, and finally concentrated to 170° C./0.6 mm. There was thus obtained as residue 210.4 g. of the substantially pure diphenyl phosphite of bis(2-chloroethyl) (1-hydroxyethyl)-phosphonate, $n_D^{25}$ 1.5351, of the following structure

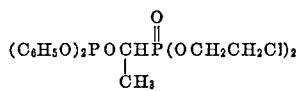

Example 3

Diphenyl phosphorochloridite (78.2 g., 0.31 mole) was added, dropwise, to a mixture consisting of 132.9 g. (0.31 mole) of tris(2-ethylhexyl) phosphite and 29.2 g. (0.31 mole) of benzaldehyde. During addition of the chloridite, the temperature of the reaction mixture rose spontaneously to 35° C., at which point cooling was applied and the remainder of the chloridite was added at a temperature of 27–35° C. The reaction mixture was then stirred without external cooling until cessation in temperature rise. The reaction was completed by heating to 105° C., and by-product 2-ethylhexyl chloride and any unreacted material was removed by subjecting the mixture to water-pump vacuum and heating it to 120° C. Concentration to 160° C./1.0 mm., gave as residue 195 g. (100% theoretical yield) of the substantially pure diphenyl phosphite of bis(2-ethylhexyl) (α-hydroxybenzyl)phosphonate, $n_D^{25}$ 1.5150, analyzing 65.26% carbon and 8.11% hydrogen as against 66.91% and 8.01%, the calculated values, and having the structure

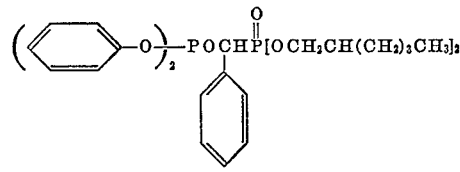

Example 4

Triethyl phosphite (26.6 g., 0.16 mole) was added to a solution of 49.5 g. (0.14 mole) of bis(p-chlorophenyl) phosphorochloridodithioite in 75 ml. of benzene. To the resulting mixture there was gradually added, with cooling, 11.6 g. (0.2 mole) of propionaldehyde. The temperature of the reaction mixture during the addition of the aldehyde was maintained at from 18° C. to 35° C. When all of the aldehyde had been added, the mixture was warmed to 44° C. and an additional 5 g. portion of the propionaldehyde was added. This caused a rapid rise to 47° C. The reaction mixture was then refluxed (68–75° C.) for 0.5 hour, cooled to 25° C., and concentrated to a pot temperature of 105° C./0.1 mm., to give 75.1 g. (theory, 71.8 g.) of the substantially pure bis(S-p-chlorophenyl) phosphorodithioite of diethyl (1-hydroxypropyl)phosphonate, analyzing 14.23% Cl and 11.66% S as against 13.8% and 12.5%, the calculated values for $C_{19}H_{24}Cl_2O_4P_2S_2$, and having the formula

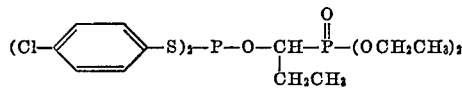

Example 5

To an ice-cooled mixture consisting of 22.1 g. (0.10 mole) of diphenylphosphinous chloride and 16.6 g. (0.10 mole) of triethyl phosphite there was added, during 6 minutes, 7.0 g. (0.12 mole) of propionaldehyde. Heat of reaction was evidenced during the addition, and when cooling was discontinued, the reaction temperature rose spontaneously to 33° C. The colorless reaction mixture was warmed to 65° C. and then concentrated to a pot temperature of 82° C./0.05 mm., to give 37.5 g. (99% theoretical yield) of the substantially pure diphenylphosphinite of diethyl (1-hydroxypropyl)phosphonate of the structure

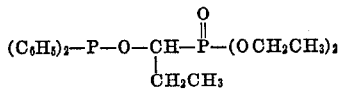

The present compound analyzed as follows:

|  | Found | Calcd. for $C_{19}H_{26}O_4P_2$ |
|---|---|---|
| Percent C | 59.07 | 60.0 |
| Percent H | 7.03 | 6.9 |

What I claim is:
1. A compound of the formula

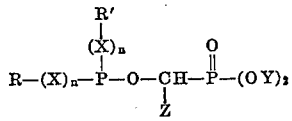

wherein R and R' are selected from the class consisting of (1) aromatic hydrocarbon radicals which are free of olefinic and acetylenic unsaturation and which contain from 6 to 12 carbon atoms and (2) said aromatic hydrocarbon radicals carrying halogen as substitution, X is selected from the class consisting of —O— and —S—, $n$ is an integer of 0 to 1, Z is selected from the class consisting of hydrogen, alkyl, aryl, alkaryl and aralkyl radicals of from 1 to 11 carbon atoms, and Y is selected from the class consisting of alkyl and haloalkyl radicals of from 1 to 12 carbon atoms.

2. A compound of the formula

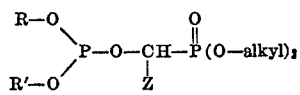

wherein R and R' are aromatic hydrocarbon radicals which are free of olefinic and acetylenic unsaturation and which contain from 6 to 12 carbon atoms, Z is an alkyl radical of from 1 to 11 carbon atoms and alkyl denotes an alkyl radical of from 1 to 12 carbon atoms.

3. A compound of the formula

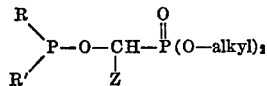

in which R and R' are aromatic hydrocarbon radicals which are free of olefinic and acetylenic unsaturation and which contain from 6 to 12 carbon atoms, Z is an aryl radical of from 6 to 11 carbon atoms and alkyl denotes an alkyl radical of from 1 to 12 carbon atoms.

4. Diphenyl phosphite of diethyl (1-hydroxypropyl)phosphonate.
5. Diphenyl phosphite of bis(2-chloroethyl) (1-hydroxyethyl)phosphonate.
6. Diphenyl phosphite of bis(2-ethylhexyl) (α-hydroxybenzyl)phosphonate.
7. Bis(S-p-chlorophenyl) phosphorodithioite of diethyl (1-hydroxypropyl)phosphonate.
8. Diphenylphosphinite of diethyl (1-hydroxypropyl)phosphonate.

References Cited in the file of this patent
Alimov et al.: Bull. Akad. Sci. U.S.S.R., Div. Chem. Sci., 1955, 761–767. (Copy in Div. 63.) 260/461.303.

---

UNITED STATES PATENT OFFICE
CERTIFICATE OF CORRECTION

Patent No. 3,014,950            December 26, 1961

Gail H. Birum

It is hereby certified that error appears in the above numbered patent requiring correction and that the said Letters Patent should read as corrected below.

Column 1, line 55, for "debenzyl" read -- dibenzyl --; column 2, line 22, for "bis(4-petylphenyl)" read -- bis(4-pentylphenyl) --.

Signed and sealed this 11th day of September 1962.

(SEAL)
Attest:

ERNEST W. SWIDER            DAVID L. LADD

UNITED STATES PATENT OFFICE
CERTIFICATE OF CORRECTION

Patent No. 3,014,950            December 26, 1961

Gail H. Birum

It is hereby certified that error appears in the above numbered patent requiring correction and that the said Letters Patent should read as corrected below.

Column 1, line 55, for "debenzyl" read -- dibenzyl --; column 2, line 22, for "bis(4-petylphenyl)" read -- bis(4-pentylphenyl) --.

Signed and sealed this 11th day of September 1962.

(SEAL)
Attest:

ERNEST W. SWIDER
Attesting Officer

DAVID L. LADD
Commissioner of Patents